US011994887B2

(12) United States Patent
Lin

(10) Patent No.: US 11,994,887 B2
(45) Date of Patent: May 28, 2024

(54) LOW DROPOUT LINEAR REGULATOR WITH HIGH POWER SUPPLY REJECTION RATIO

(71) Applicant: SG MICRO CORP, Beijing (CN)

(72) Inventor: Yu Lin, Beijing (CN)

(73) Assignee: SG MICRO CORP, Beijing (CN)

( * ) Notice: Subject to any disclaimer, the term of this patent is extended or adjusted under 35 U.S.C. 154(b) by 227 days.

(21) Appl. No.: 17/769,861

(22) PCT Filed: Sep. 4, 2020

(86) PCT No.: PCT/CN2020/113555
§ 371 (c)(1),
(2) Date: Apr. 18, 2022

(87) PCT Pub. No.: WO2021/073305
PCT Pub. Date: Apr. 22, 2021

(65) Prior Publication Data
US 2022/0382306 A1 Dec. 1, 2022

(30) Foreign Application Priority Data
Oct. 18, 2019 (CN) ........................ 201910995503.X

(51) Int. Cl.
*G05F 1/56* (2006.01)
*G05F 3/26* (2006.01)
*G05F 3/30* (2006.01)

(52) U.S. Cl.
CPC .................. *G05F 1/56* (2013.01); *G05F 3/26* (2013.01); *G05F 3/30* (2013.01)

(58) Field of Classification Search
CPC ................. G05F 1/56; G05F 3/26; G05F 3/30
See application file for complete search history.

(56) References Cited

U.S. PATENT DOCUMENTS 5,867,070 A * 2/1999 Park ..................... H03K 3/2821 331/113 R
6,208,208 B1 * 3/2001 Komatsu ............... H03F 3/3032 330/255
(Continued)

FOREIGN PATENT DOCUMENTS

CN 102376823 A 3/2012
CN 103713682 A 4/2014
(Continued)

OTHER PUBLICATIONS

International Search Report (including English translation) and Written Opinion for International Application No. PCT/CN2020/113555, dated Dec. 3, 2020, 10 pages.

*Primary Examiner* — Yusef A Ahmed
(74) *Attorney, Agent, or Firm* — Westman, Champlin & Koehler, P.A.

(57) ABSTRACT

Disclosed is a low dropout linear regulator including a power transistor and an error amplifier having a first input stage, a second input stage and a control circuit. The first input stage includes a first pair of transistors receiving an output voltage and a reference voltage, the second input stage includes a second pair of transistors receiving the output voltage and the reference voltage, the first and second pairs of transistors have different conductivity types. The control circuit controls turn-on and turn-off states of the first input stage according to the reference voltage, and turns on the first input stage when the reference voltage is less than a preset threshold, so that the error amplifier operates normally and the output voltage changes smoothly. When the reference voltage is greater than the preset threshold, the control circuit turns off the first input stage so that only the second input stage operates.

9 Claims, 3 Drawing Sheets

200

(56) References Cited

U.S. PATENT DOCUMENTS 6,465,994 B1 * 10/2002 Xi ........................ G05F 1/575 323/280
6,518,737 B1 * 2/2003 Stanescu ................ G05F 1/575 323/280
7,414,473 B1 * 8/2008 Rayanakorn ............ H03F 1/483 330/257
8,188,792 B1 * 5/2012 Narayan ................ G05F 3/262 330/257
10,177,713 B1 * 1/2019 Far ........................ H03F 1/0244
10,404,220 B2 * 9/2019 Sun ........................ H03F 3/3022
10,416,695 B1 * 9/2019 Bohannon ........... H03F 3/45192
11,106,229 B2 * 8/2021 Ideno .................... H02H 1/0007
11,159,135 B2 * 10/2021 Broughton .............. H04L 12/40
11,281,244 B2 * 3/2022 Matyscak ................ G05F 1/56
2002/0171403 A1 * 11/2002 Lopata ................ H03F 3/45183 323/280
2005/0218872 A1 * 10/2005 Wich ...................... G05F 3/262 323/268
2005/0285676 A1 * 12/2005 Jones .................... H03F 3/3022 330/255
2007/0030055 A1 * 2/2007 Hasegawa ............... G05F 1/575 327/543
2008/0272844 A1 * 11/2008 Rayanakorn ............ H03F 1/483 330/253
2009/0033310 A1 * 2/2009 Erbito, Jr. ................ G05F 1/56 327/143
2012/0031425 A1 2/2012 Kadar et al.
2012/0032939 A1 * 2/2012 Tsuchi ................. G09G 3/3614 327/543
2013/0027007 A1 * 1/2013 Zhong ................ H03F 3/45179 330/253
2013/0049721 A1 * 2/2013 Lo ........................... G05F 1/575 323/280
2014/0132347 A1 * 5/2014 Draxelmayr ........ H03F 3/45183 330/260
2014/0300332 A1 * 10/2014 Ganta ....................... G05F 1/56 323/273
2015/0212530 A1 * 7/2015 Forejtek .................. G05F 1/575 323/280
2015/0263683 A1 * 9/2015 Kronmueller ............. H03F 3/16 330/252
2016/0043539 A1 * 2/2016 Mallala ................... G05F 1/573 361/18
2017/0017250 A1 * 1/2017 Peluso .................... G05F 1/575
2017/0090493 A1 * 3/2017 Cui ......................... G05F 1/575
2017/0242449 A1 * 8/2017 Chen ....................... G05F 1/575
2018/0157283 A1 * 6/2018 Ming .................. H03F 3/45183
2020/0183439 A1 * 6/2020 Gupta ..................... G05F 1/575
2021/0034085 A1 * 2/2021 Mercer ................. H02M 3/158
2021/0405677 A1 * 12/2021 Panja ...................... G05F 3/267
2022/0181971 A1 * 6/2022 Mitev ..................... G05F 1/563
2022/0263540 A1 * 8/2022 Ikram ....................... H04B 3/06

FOREIGN PATENT DOCUMENTS

CN 107491129 A 12/2017
CN 109683651 A 4/2019

* cited by examiner

- prior art -

LOW DROPOUT LINEAR REGULATOR WITH HIGH POWER SUPPLY REJECTION RATIO

CROSS-REFERENCE TO RELATED APPLICATION

This application is a Section 371 National Stage application of International Application No. PCT/CN2020/113555, which was filed on 4 Sep. 2020, and published as WO2021/073305 A1, on Apr. 22, 2021, not in English, which claims priority to Chinese patent application No. 201910995503.X, filed on Oct. 18, 2019 and entitled "Low dropout linear regulator with high power supply rejection ratio", the entire contents of which are incorporated by reference in their entireties.

FIELD OF THE DISCLOSURE

The present disclosure relates to a technical field of integrated circuits, and more particularly, to a low dropout linear regulator with high power supply rejection ratio.

DESCRIPTION OF THE RELATED ART

A low dropout linear regulator (i.e., Low Dropout Regulator, LDO) is configured to convert an unstable input voltage into an adjustable DC output voltage used as a power supply for other systems. A linear regulator is often used for on-chip power management of a chip of a mobile consumer electronic equipment due to its simple structure, low static power consumption, and low output voltage ripple.

FIG. 1 shows a circuit schematic diagram of a low dropout linear regulator with high power supply rejection ratio according to the prior art. As shown in FIG. 1, the low dropout linear regulator 100 comprises a power transistor Mnp, an error amplifier 110 and a buffer 120. The power transistor Mnp is used to provide an output voltage Vout to a load according to a power supply voltage VDD provided by a power supply terminal. The error amplifier 110 is used to compare the output voltage Vout with a reference signal Vref to obtain an error signal between the output voltage Vout and the reference signal Vref. The buffer 120 is used to control a voltage drop of the power transistor Mnp according to the error signal, so as to stabilize the output voltage Vout.

In order to obtain a higher power supply rejection ratio, an input stage transistor pair Mn1 and Mn2 of the error amplifier of the low dropout linear regulator in the prior art are usually implemented by N-type MOSFETs. When the output voltage Vout starts to rise from a low level, the N-type MOSFETs Mn1 and Mn2 would go through a startup process. At the switch-on moment of the N-type MOSFETs Mn1 and Mn2, a sudden change would occur on the output voltage, and this instantaneous voltage would greatly increase an instantaneous current in the power transistor, causing damage to the power transistor and the load, and seriously affecting circuit stability.

SUMMARY OF THE DISCLOSURE

In view of the above problems, an objective of the present disclosure is to provide a low dropout linear regulator with high power supply rejection ratio, which can ensure that an output voltage can change smoothly during a turn-on process, and improve circuit stability without compromising the power supply rejection ratio of the low dropout linear regulator.

According to an embodiment of the present disclosure, a low dropout linear regulator with high power supply rejection ratio is provided, and comprises a power transistor and an error amplifier, wherein the error amplifier is configured to compare an output voltage of the low dropout linear regulator with a reference voltage and drive the power transistor according to an error signal between the output voltage and the reference voltage, wherein the error amplifier comprises: a first input stage comprising a first pair of transistors for receiving the output voltage and the reference voltage; a second input stage comprising a second pair of transistors for receiving the output voltage and the reference voltage; a cascode amplifier stage respectively connected to the first input stage and the second input stage for providing the error signal between the output voltage and the reference voltage; and a control circuit for controlling turn-on and turn-off states of the first input stage according to the reference voltage, wherein the first pair of transistors have a conductivity type different from a conductivity type of the second pair of transistors.

Preferably, the first pair of transistors are respectively selected from P-type metal-oxide-semiconductor field effect transistors, and the second pair of transistors are respectively selected from N-type metal-oxide-semiconductor field effect transistors.

Preferably, the control circuit is configured to turn on the first input stage when the reference voltage is less than a preset threshold, and to turn off the first input stage when the reference voltage is greater than the preset threshold.

Preferably, the control circuit is further configured to turn off the first input stage after a predetermined delay period started from a moment that the reference voltage is equal to the preset threshold.

Preferably, the first input stage comprises a first transistor, a second transistor, a first current source and a control switch, a first terminal of the first current source is connected to a power supply terminal, and a second terminal of the first current source is connected to a first terminal of the control switch, first terminals of the first transistor and the second transistor are connected to each other and are connected to a second terminal of the control switch, a control terminal of the first transistor is configured to receive the output voltage, the control terminal of the second transistor is configured to receive the reference voltage, and second terminals of the first transistor and the second transistor are respectively connected to the cascode amplifier stage, the control circuit is configured to control turn-on and turn-off states of the control switch according to the reference voltage and the preset threshold so as to control turn-on and turn-off states of the first input stage.

Preferably, the second input stage comprises a third transistor, a fourth transistor and a second current source, and first terminals of the third transistor and the fourth transistor are respectively connected to the cascode amplifier stage, second terminals of the third transistor and the fourth transistor are connected to each other and are connected to a first terminal of the second current source, a second terminal of the current source is connected to ground, and a control terminal of the third transistor is configured to receive the output voltage, and a control terminal of the fourth transistor is configured to receive the reference voltage.

Preferably, the cascode amplifier stage comprises: a fifth transistor, a sixth transistor, a seventh transistor and an eighth transistor connected in series between the power supply terminal and the ground; and a ninth transistor, a tenth transistor, an eleventh transistor and a twelfth transistor connected in series between the power supply terminal and the ground, wherein the fifth transistor and the ninth transistor form a current mirror, control terminals of the sixth transistor and the tenth transistor are connected to each other, control terminals of the seventh transistor and the eleventh transistor are connected to each other and receive a first bias voltage, and control terminals of the eighth transistor and the twelfth transistor are connected to each other and receive a second bias voltage, a second terminal of the fifth transistor is connected to a first terminal of the third transistor, a second terminal of the sixth transistor is connected to a first terminal of the fourth transistor, a second terminal of the ninth transistor is connected to the second terminal of the first transistor, a second terminal of the tenth transistor is connected to a second terminal of the second transistor, an intermediate node between the eighth transistor and the tenth transistor is configured to provide the error signal.

Preferably, the fifth transistor, the sixth transistor, the seventh transistor and the eighth transistor are respectively selected from P-type metal-oxide-semiconductor field effect transistors, the ninth transistor, the tenth transistor, the eleventh transistor and the twelfth transistor are respectively selected from N-type metal-oxide-semiconductor field effect transistors.

Preferably, the low dropout linear regulator further comprises a buffer connected between an output terminal of the error amplifier and the control terminal of the power transistor.

Preferably, the buffer is a source follower or a CMOS buffer.

Preferably, the preset threshold is equal to a turn-on threshold voltage of the second pair of transistors.

The low dropout linear regulator with the high power supply rejection ratio according to embodiments of the present disclosure has the following beneficial effects.

The error amplifier comprises a first input stage, a second input stage, and a control circuit. The first input stage comprises a first pair of transistors, the second input stage comprises a second pair of transistors, the first pair of transistors are selected from P-type metal-oxide-semiconductor field effect transistors, and the second pair of transistors are selected from N-type metal-oxide-semiconductor field effect transistors. The control circuit is used to control the turn-on and turn-off states of the first input stage according to the reference voltage, and to turn on the first input stage when the reference voltage is less than the preset threshold, so that the error amplifier can work normally and it is ensured that the output voltage can change smoothly; and when the reference voltage is greater than the preset threshold, the control circuit is also configured to turn off the first input stage so that only the second input stage operates, therefore, the power supply rejection ratio of the low dropout linear regulator would not be affected.

BRIEF DESCRIPTION OF THE DRAWINGS

The above and other objects, features and advantages of the present disclosure will become more apparent from the description below with reference to the accompanying drawings, wherein.

DETAILED DESCRIPTION OF EMBODIMENTS OF THE DISCLOSURE

Figure 1:
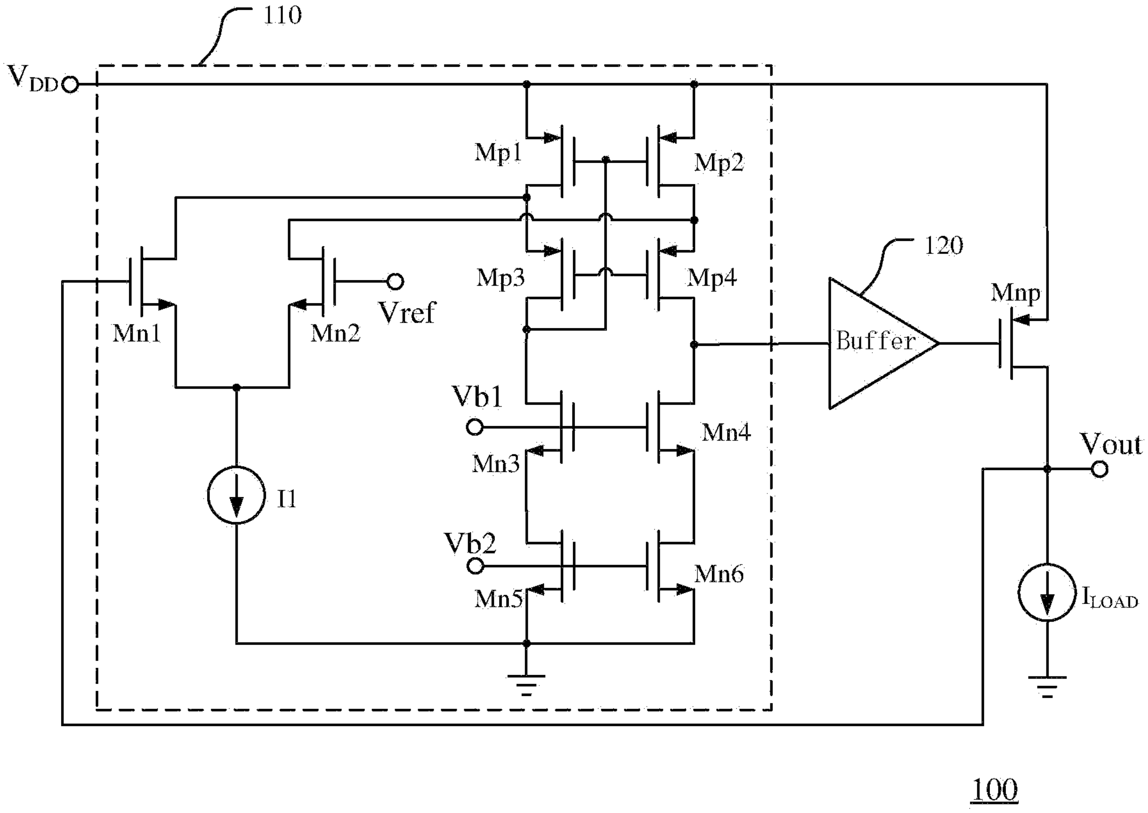
FIG. 1 shows a circuit schematic diagram of a low dropout linear regulator with high power supply rejection ratio according to the prior art.

Various embodiments of the present disclosure will be described in more detail below with reference to the accompanying drawings. In the various figures, same elements are denoted by same or similar reference numerals. For the sake of clarity, various parts in the figures are not drawn to scale.

It should be understood that, in following descriptions, "circuit" refers to a conductive loop formed by at least one element or sub-circuit through electrical or electromagnetic connection. When referring that an element or circuit is "connected" to another element or referring that an element/circuit is "connected" between two nodes, it can be directly coupled or connected to the other element or an intervening element may be present, and the connection between the elements may be physical, logical, or a combination thereof. In contrast, when an element is referred to as being "directly coupled" or "directly connected" to another element, it is meant that no intervening element exists.

In the present disclosure, an MOSFET comprises a first terminal, a second terminal and a control terminal, and when the MOSFET is operated under turn-on state, a current flows from the first terminal to the second terminal. The first terminal, the second terminal and the control terminal of a P-type MOSFET can be a source electrode, a drain electrode and a gate electrode, respectively, and the first terminal, the second terminal and the control terminal of an N-type MOSFET can be the drain electrode, the source electrode and the gate electrode, respectively.

The present disclosure is further described with reference to the accompanying drawings and embodiments.

Figure 2:
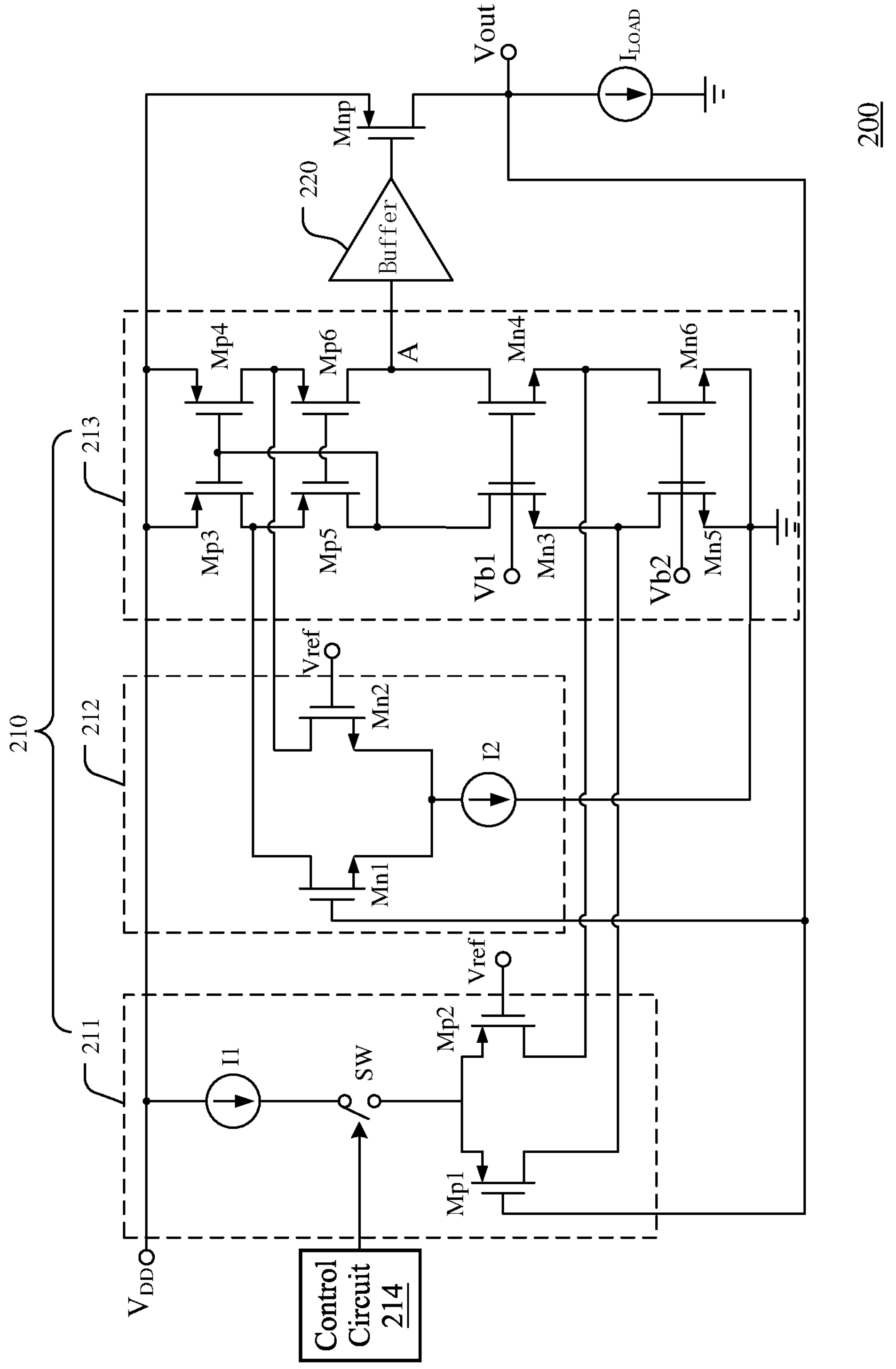
FIG. 2 shows a circuit schematic diagram of a low dropout linear regulator with high power supply rejection ratio according to an embodiment of the present disclosure.

FIG. 2 shows a circuit schematic diagram of a low dropout linear regulator with high power supply rejection ratio according to an embodiment of the present disclosure. As shown in FIG. 2, a low dropout linear regulator 200 is configured to convert a power supply voltage VDD of a power supply terminal into an output voltage Vout. The low dropout linear regulator 200 comprises an error amplifier 210 and a power transistor Mnp.

In this embodiment, the power transistor Mnp is selected from, for example, P-type MOSFET, a control terminal of the power transistor Mnp is connected to an output terminal of the error amplifier 210, a first terminal of the power transistor Mnp is connected to the power supply terminal, and a second terminal of the power transistor Mnp is connected to the output terminal. The error amplifier 210 is configured to control a resistance between the first terminal and the second terminal of the power transistor Mnp by controlling a voltage of the control terminal of the power transistor Mnp, thereby controlling a voltage drop of the power transistor Mnp.

In some other embodiments, the power transistor Mnp can also be an NPN Darlington transistor, an NPN-type bipolar transistor, a PNP-type bipolar transistor, an N-type MOSFET, or the like.

Further, the error amplifier 210 is configured to compare the output voltage Vout with a reference voltage Vref, and when there is a deviation between the output voltage Vout and a reference voltage Vref, the error amplifier 210 is configured to amplify the deviation and control the transistor voltage drop of the power transistor Mnp. In this embodiment, when the output voltage Vout decreases, a voltage difference between the output voltage Vout and the reference voltage Vref increases, so that the voltage applied to the control terminal of the power transistor Mnp increases, a turn-on resistance between the first terminal and the second terminal of the power transistor Mnp decreases, and the voltage drop across the power transistor Mnp decreases, so that the voltage at the output terminal of the low dropout linear regulator 200 increases. Therefore, the output voltage Vout can be recovered to a normal level.

In some other embodiments of the present disclosure, the low dropout linear regulator further comprises a feedback network connected between the output terminal and ground, and the error amplifier 210 is configured to control the transistor voltage drop of the power transistor Mnp according to the voltage difference between the feedback voltage provided by the feedback network and the reference voltage.

When the output voltage Vout starts to increase from 0, a pair of transistors implemented by N-type MOSFETs at an input stage of the error amplifier 210 would go through a startup process, and the output voltage would have a sudden change when the transistor pair implemented by the N-type MOSFETs are turned on. The instantaneous voltage change may increase a current in the power transistor, cause damage to the power transistor and a load, and seriously affect circuit stability.

In order to solve the technical problems in the prior art and improve the stability and power supply rejection ratio of the low dropout linear regulator, the error amplifier 210 according to the embodiment of the present disclosure comprises a first input stage 211, a second input stage 212, a cascode amplifier stage 213 and a control circuit 214.

The first input stage 211 and the second input stage 212 are also called pre-stage circuits, and are generally implemented by high-performance differential amplifier circuits with double input terminals, which are used to receive the output voltage Vout and the reference voltage Vref, respectively. The cascode amplifier stage 213 is a main amplifier circuit of the error amplifier, and its function is to obtain an error signal between the input voltage Vout and the reference voltage Vref.

Specifically, the first input stage 211 comprises P-type MOSFETs Mp1 and Mp2, a current source I1, and a control switch SW. A first terminal of the current source I1 is connected to the power supply terminal to receive the power supply voltage VDD, the second terminal is connected to a first terminal of the control switch SW, and the P-type MOSFETs Mp1 and Mp2 form a differential transistor pair, that is, first terminals of the P-type MOSFETs Mp1 and Mp2 are connected to each other, and the first terminals of the P-type MOSFETs Mp1 and Mp2 are both connected to a second terminal of the control switch SW. A control terminal of the P-type MOSFET Mp1 is used for receiving the output voltage Vout, and a control terminal of the P-type MOSFET Mp2 is used for receiving the reference voltage Vref. Second terminals of the P-type MOSFETs Mp1 and Mp2 are respectively connected to the cascode amplifier stage 213.

The second input stage 212 comprises N-type MOSFETs Mn1 and Mn2 and a current source 12. The N-type MOSFETs Mn1 and Mn2 form a differential transistor pair, that is, second terminals of the N-type MOSFETs Mn1 and Mn2 are connected to each other, and the second terminals of the N-type MOSFETs Mn1 and Mn2 are both connected to a first terminal of the current source 12, and a second terminal of the current source 12 is connected to the ground. A control terminal of the N-type MOSFET Mn1 is used for receiving the output voltage Vout, and a control terminal of the N-type MOSFET Mn2 is used for receiving the reference voltage Vref. First terminals of the N-type MOSFETs Mn1 and Mn2 are respectively connected to the cascode amplifier stage 213.

The cascode amplifier stage 213 comprises P-type MOSFETs Mp3 to Mp6, and N-type MOSFETs Mn3 to Mn6.

The P-type MOSFETs Mp3 and Mp5 and the N-type MOSFETs Mn3 and Mn5 are sequentially connected in series in a first branch between the power supply terminal and the ground. When the P-type MOSFETs Mp3 and Mp5 and the N-type MOSFETs Mn3 and Mn5 are operated under turn-on state, a current flows from the power supply terminal to the ground through the P-type MOSFETs Mp3 and Mp5 and the N-type MOSFETs Mn3 and Mn5.

The P-type MOSFETs Mp4 and Mp6 and the N-type MOSFETs Mn4 and Mn6 are sequentially connected in series in a second branch between the power supply terminal and the ground. When the P-type MOSFETs Mp4 and Mp6 and the N-type MOSFETs Mn4 and Mn6 are operated under turn-on state, a current flows from the power supply terminal to the ground through the P-type MOSFETs Mp4 and Mp6 and the N-type MOSFETs Mn4 and Mn6.

Control terminals of the P-type MOSFETs Mp3 and Mp4 are connected to each other, and are both connected to a second terminal of the P-type MOSFET Mp5, so as to serve as mirror transistors with each other. Control terminals of the P-type MOSFETs Mp5 and Mp6 are connected to each other. Control terminals of the N-type MOSFETs Mn3 and Mn4 are connected to each other, and receive a bias voltage Vb1. Control terminals of the N-type MOSFETs Mn5 and Mn6 are connected to each other, and receive a bias voltage Vb2. A second terminal of the P-type MOSFET Mp3 is connected to a first terminal of the N-type MOSFET Mn1, and a second terminal of the P-type MOSFET Mp4 is connected to a first terminal of the N-type MOSFET Mn2. A second terminal of the N-type MOSFET Mn3 is connected to a second terminal of the P-type MOSFET Mp1, and a second terminal of the N-type MOSFET Mn4 is connected to a second terminal of the P-type MOSFET Mp2. A node A between the P-type MOSFET Mp6 and the N-type MOSFET Mn4 is configured to provide the error signal.

The control circuit 214 is configured to compare the reference voltage Vref with turn-on threshold voltages of the N-type MOSFETs Mn1 and Mn2, and turn on or turn off the control switch SW according to a result of the comparison, so as to control the turn-on and turn-off states of the first input stage 211.

During a period of time when the reference voltage Vref gradually increases from 0, the reference voltage Vref is lower than the turn-on threshold voltages of the N-type MOSFETs Mn1 and Mn2, so that the N-type MOSFETs Mn1 and Mn2 are in turn-off state, and the P-type MOSFETs Mp1 and Mp2 are turned on by the control circuit 214 at this time, the first input stage 211 operates, and the error amplifier 210 can operate normally. When the reference voltage Vref is equal to or greater than the turn-on threshold voltages of the N-type MOSFETs Mn1 and Mn2, the N-type MOSFETs Mn1 and Mn2 are turned on, the first input stage 211 and the second input stage 212 are turned on at the same time, the control circuit 214 turns off the P-type MOSFETs Mp1 and Mp2 after a certain time delay. At this time, the first input stage 211 is turned off, and the second input stage 212 operates.

The error amplifier according to the embodiments of the present disclosure ensures that the output voltage can be changed smoothly during startup process, which is beneficial to improve circuit stability. In addition, when the reference voltage is increased to make the error amplifier operate normally, the control circuit is configured to turn off the first input stage and turn on the second input stage, so as not to affect the power supply rejection ratio of the low dropout linear regulator.

In some other embodiments of the present disclosure, the low dropout linear regulator 200 further comprises a buffer 220 connected between the output terminal of the error amplifier 210 and the control terminal of the power transistor Mnp. The buffer 220 is used to isolate large terminal-to-ground parasitic capacitance between the output terminal of the error amplifier and the control terminal of the power transistor Mnp, and make the control terminal of the power transistor receive a fast slew rate driving, which can improve a response speed of the low dropout linear regulator, thereby further reducing overshoot or undershoot. In one of the embodiments, the buffer may be a source follower, a CMOS buffer, or other suitable buffer.

Figure 3:
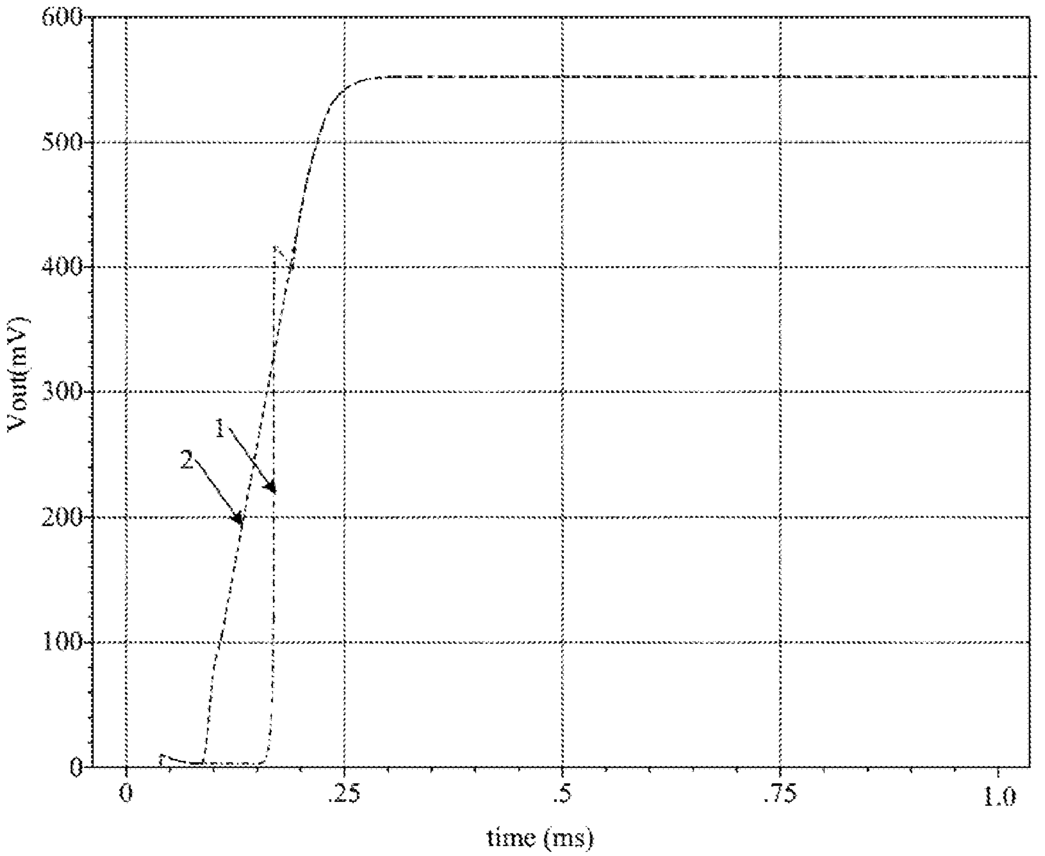
FIG. 3 shows output waveform diagrams of the low dropout linear regulator according to the prior art and the low dropout linear regulator according to an embodiment of the present disclosure, respectively.

FIG. 3 shows output waveform diagrams of the low dropout linear regulator according to the prior art and the low dropout linear regulator according to an embodiment of the present disclosure, respectively, wherein the horizontal axis represents time, and the vertical axis represents voltage magnitudes of the output voltages. Curve 1 represents a variation curve of the output voltage of the low dropout linear regulator in the prior art, and a curve 2 represents a variation curve of the output voltage of the low dropout linear regulator according to the embodiments of the present disclosure.

As shown in FIG. 3, during the startup process of the low dropout linear regulator in the prior art, a variation slope of the output voltage is relatively large; while during the startup process of the low dropout linear regulator according to the embodiments of the present disclosure, a variation slope of the output voltage is small, and the output voltage can change smoothly. It can be seen that, compared with the prior art, the low dropout linear regulator of the present disclosure can make the output voltage change smoothly when the reference voltage starts to increase from 0, which is beneficial to improve circuit stability.

To sum up, the low dropout linear regulator provided according to the embodiments of the present disclosure comprises the error amplifier and the power transistor, wherein the error amplifier comprises the first input stage, the second input stage, and the control circuit. The first input stage comprises a first pair of transistors, the second input stage comprises a second pair of transistors, the first pair of transistors are selected from P-type metal-oxide-semiconductor field effect transistors, and the second pair of transistors are selected from N-type metal-oxide-semiconductor field effect transistors. The control circuit is configured to control the turn-on and turn-off states of the first input stage according to the reference voltage, and to turn on the first input stage when the reference voltage is less than the preset threshold, so that the error amplifier can operate normally and it is ensured that the output voltage can change smoothly. When the reference voltage is greater than the preset threshold, the control circuit is configured to turn off the first input stage so that only the second input stage operates. Therefore, the power supply rejection ratio of the low dropout linear regulator would not be affected.

Embodiments in accordance with the present disclosure are described above, and these embodiments do not exhaustively describe all the details and do not limit the present invention to specific embodiments only. Obviously, many modifications and variations are possible in light of the above. These embodiments has been chosen and described in detail by the specification to explain the principles and embodiments of the present disclosure so that those skilled in the art can make good use of the present disclosure and the modified use based on the present disclosure. The protection scope of the present invention should be based on the scope defined by the claims of the present invention.

What is claimed is:

1. A low dropout linear regulator with high power supply rejection ratio, comprising:

a power transistor and an error amplifier, wherein the error amplifier is configured to compare an output voltage of the low dropout linear regulator with a reference voltage and drive the power transistor according to an error signal between the output voltage and the reference voltage, wherein the error amplifier comprises:

a first input stage comprising a first pair of transistors that includes a first transistor and a second transistor, configured to receive the output voltage and the reference voltage;

a second input stage comprising a second pair of transistors that includes a third transistor and a fourth transistor, configured to receive the output voltage and the reference voltage;

a cascode amplifier stage, which is connected to the first input stage and the second input stage, respectively, and is configured to provide the error signal between the output voltage and the reference voltage; and a control circuit configured to control turn-on and turn-off states of the first input stage according to the reference voltage, wherein the first pair of transistors have a conductivity type different from a conductivity type of the second pair of transistors;

wherein the control circuit is further configured to turn off the first input stage after a predetermined delay period started from a moment that the reference voltage is equal to a preset threshold;

wherein the first input stage comprises the first pair of transistors, a first current source and a control switch, a first terminal of the first current source is connected to a power supply terminal, and a second terminal of the first current source is connected to a first terminal of the control switch, first terminals of the first transistor and the second transistor are connected to each other and are connected to a second terminal of the control switch, a control terminal of the first transistor is configured to receive the output voltage, a control terminal of the second transistor is configured to receive the reference voltage, second terminals of the first transistor and the second transistor are respectively connected to the cascode amplifier stage, and the control circuit is configured to control the turn-on and turn-off states of the first input stage by controlling turn-on and turn-off states of the control switch according to the reference voltage and the preset threshold.

2. The low dropout linear regulator according to claim 1, wherein the first pair of transistors are respectively selected from P-type metal-oxide-semiconductor field effect transistors, and the second pair of transistors are respectively selected from N-type metal-oxide-semiconductor field effect transistors.

3. The low dropout linear regulator according to claim 2, wherein the control circuit is configured to turn on the first input stage when the reference voltage is less than the preset threshold, and to turn off the first input stage when the reference voltage is greater than the preset threshold.

4. The low dropout linear regulator according to claim 1, wherein the second input stage comprises the second pair of transistors and a second current source, first terminals of the third transistor and the fourth transistor are respectively connected to the cascode amplifier stage, second terminals of the third transistor and the fourth transistor are connected to each other and are connected to a first terminal of the second current source, and a second terminal of the current source is connected to ground, a control terminal of the third transistor is configured to receive the output voltage, a control terminal of the fourth transistor is configured to receive the reference voltage.

5. The low dropout linear regulator according to claim 4, wherein the cascode amplifier stage comprises:

a fifth transistor, a sixth transistor, a seventh transistor and an eighth transistor connected in series between the power supply terminal and the ground; and a ninth transistor, a tenth transistor, an eleventh transistor and a twelfth transistor connected in series between the power supply terminal and the ground, wherein the fifth transistor and the ninth transistor form a current mirror, control terminals of the sixth transistor and the tenth transistor are connected to each other, control terminals of the seventh transistor and the eleventh transistor are connected to each other and receive a first bias voltage, control terminals of the eighth transistor and the twelfth transistor are connected to each other and receive a second bias voltage, a second terminal of the fifth transistor is connected to a first terminal of the third transistor, a second terminal of the ninth transistor is connected to a first terminal of the fourth transistor, a second terminal of the seventh transistor is connected to the second terminal of the first transistor, a second terminal of the eleventh transistor is connected to the second terminal of the second transistor, an intermediate node between the eleventh transistor and the tenth transistor is configured to provide the error signal.

6. The low dropout linear regulator according to claim 5, wherein the fifth transistor, the sixth transistor, the ninth transistor and the tenth transistor are respectively selected from P-type metal-oxide-semiconductor field effect transistors, the seventh transistor, the eighth transistor, the eleventh transistor and the twelfth transistor are respectively selected from N-type metal-oxide-semiconductor field effect transistors.

7. The low dropout linear regulator according to claim 1, wherein the low dropout linear regulator further comprises a buffer connected between an output terminal of the error amplifier and a control terminal of the power transistor.

8. The low dropout linear regulator according to claim 7, wherein the buffer is a source follower or a CMOS buffer.

9. The low dropout linear regulator according to claim 1, wherein the preset threshold is equal to a turn-on threshold voltage of the second pair of transistors.

* * * * *